United States Patent [19]

Kamata et al.

[11] 4,362,845

[45] Dec. 7, 1982

[54] POLYVINYL CHLORIDE-BASE RESIN AND MULTISTAGE GRAFT RESIN COMPOSITION

[75] Inventors: Kazumasa Kamata; Kazuo Kishida; Kazuo Ueda, all of Ohtake; Norihisa Osaka, Nagoya, all of Japan

[73] Assignee: Mitsubishi Rayon Co., Ltd., Tokyo, Japan

[21] Appl. No.: 329,070

[22] Filed: Dec. 9, 1981

[30] Foreign Application Priority Data

Dec. 18, 1980 [JP] Japan ............................. 55-179501

[51] Int. Cl.$^3$ ................... C08L 27/06; C08L 51/04
[52] U.S. Cl. ............................... 525/57; 525/59; 525/73; 525/78; 525/84; 525/83; 525/82; 525/310; 525/902
[58] Field of Search ............... 525/84, 83, 57, 902

[56] References Cited

U.S. PATENT DOCUMENTS

| | | | |
|---|---|---|---|
| 3,288,886 | 11/1966 | Himei et al. | 260/876 |
| 3,775,514 | 11/1973 | Amagi et al. | 525/84 |
| 3,899,547 | 8/1975 | Amagi et al. | 525/84 |
| 3,907,928 | 9/1975 | Kumabe et al. | 525/83 |
| 4,041,106 | 8/1977 | Ide et al. | 260/876 R |
| 4,132,749 | 1/1979 | Saito et al. | 525/84 |

Primary Examiner—Carman J. Seccuro
Attorney, Agent, or Firm—Oblon, Fisher, Spivak, McClelland & Maier

[57] ABSTRACT

A composition with high impact resistance and little fish eyes content, comprising 97 to 60 parts by weight of a polyvinyl chloride-base resin and 3 to 40 parts by weight of a graft copolymer obtained by the three-stage graft-polymerization of 65 to 25 parts by weight of a monomer combination (B) comprising 12 to 57% by weight of methyl methacrylate, 1 to 24% by weight of at least one of alkyl acrylates having a $C_{1-8}$-alkyl group, 80 to 40% by weight of styrene and 0 to 3% by weight of a polyfunctional crosslinking agent having one or more alkyl groups in the molecule onto 35 to 75 parts by weight of a butadiene-base elastomer (A) containing 30% by weight or more of 1,3-butadiene units, said three-stage graft polymerization being carried out in the following way: at first at least one member selected from the group consisting of electrolytes and carboxyl-containing polymer latices is added to the reaction system; then in the first stage monomer mixture consisting of major amount of methyl methacrylate and minor amount of an alkyl acrylate or acrylates, which has a proportion of 50 to 90% by weight based on total weight of methyl methacrylate and alkyl acrylate or acrylates, and, if included in said monomer combination, a polyfunctional crosslinking agent are graft-polymerized; in the second stage, styrene is graft-polymerized; and in the third stage, the remaining 10 to 50% by weight of methyl methacrylate and an alkyl acrylate or acrylates are graft-polymerized.

8 Claims, No Drawings

POLYVINYL CHLORIDE-BASE RESIN AND MULTISTAGE GRAFT RESIN COMPOSITION

This invention relates to a resin composition comprising a polyvinyl chloride-base resin as major component, which is excellent in impact resistance and contains a reduced amount of fish eyes.

Polyvinyl chloride (hereinafter referred to briefly as PVC) resin is produced in a large quantity and is widely used in various fields because of its inexpensiveness and excellent physical and chemical properties. When used alone, however, this resin reveals its disadvantage of brittleness upon being subjected to an impact. In order to overcome such a difficulty, various impact resistance improving agents (hereinafter referred to as impact modifier) have been produced and sold. In order to increase the impact resistance of a PVC-base resin composition, it is preferred to use an impact modifier produced by the graft polymerization of methyl methacrylate onto the outer layer of an elastomer. When a conventional impact modifier obtained by graft-polymerizing styrene and methyl methacrylate successively in two stages onto an elastomer is used, the PVC-base resin composition becomes defective in melt fluidity gloss and stress whitening, though the impact resistance is considerably improved. To the contrary, when at first methyl methacrylate is graft-polymerized, then followed by styrene, the resulting impact modifier tends to retain unreacted styrene and becomes inferior in its ability to improve the impact resistance, though the gloss-improving ability is increased. In either case, the resulting impact modifier tends to give rise to an appreciable amount of fish eyes in the final shaped product.

In order to obtain a polyvinyl chloride resin composition containing a remarkably reduced amount of fish eyes and being excellent in impact resistance, the present inventors, based on these knowledges and informations, conducted extensive and detailed investigations, and as the result, have accomplished the present invention.

This invention provided a resin composition with very small fish eye content and a much improved impact resistance, comprising 97 to 60 parts by weight of a polyvinyl chloride-base resin and 3 to 40 parts by weight of a graft copolymer obtained by the 3-stage graft-polymerization of 65 to 25 parts by weight of a monomer combination (B) comprising 12 to 57% by weight of methyl methacrylate, 1 to 24% by weight of at least one of alkyl acrylates having a $C_{1-8}$-alkyl group, 80 to 40% by weight of styrene and 0 to 3% by weight of at least one of polyfunctional crosslinking agents having one or more alkyl groups in the molecule onto 35 to 75 parts by weight of a butadiene-base elastomer (A) containing 30% by weight or more of 1,3-butadiene units, said 3-stage graft polymerization being carried out in the following way: at first at least one member selected from the group consisting of electrolytes dand carboxyl-containing polymer latices is added to the butadiene-base elastomer (A), then in the first stage, monomer mixture consisting of major amount of methyl methacrylate and minor amount of an alkyl acrylate or acrylates, which has a proportion of 50 to 90% by weight based on total weight of methyl methacrylate and alkyl acrylate or acrylates, and, if included in said monomer combination, a polyfunctional crosslinking agent are graft-polymerized; in the second stage, styrene is graft-polymerized; and in the third stage, the remaining 10 to 50% by weight of methyl methacrylate and an alkyl acrylate or acrylates are graft-polymerized.

The elastomer used in this invention is a butadiene-base polymer containing 30% by weight or more of 1,3-butadiene units and preferably having an average particle size of $0.12\mu$ or less. If the 1,3-butadiene unit content of said polymer is less than 30% by weight, the PVC-base resin composition becomes inferior in impact resistance. If it is intended to make the average particle size of said polymer to exceed $0.12\mu$, a prolonged polymerization time will be necessary at the sacrifice of productivity and yet the anti-impact property will not be so much improved.

The butadiene-base elastomer used in this invention is composed of 30 to 100% by weight of 1,3-butadiene, 70% by weight or less of a monoolefinic monomer (e.g. acrylonitrile, styrene, acrylate ester, methacrylate ester, or the like) and 0% to 2% by weight of a polyfunctional monomer (e.g. divinylbenzene, ethylene glycol dimethacrylate, 1,3-butylene glycol dimethacrylate, or the like). If the polyfunctional monomer content exceeds 2% by weight, the impact strength of the final resin composition will be decreased. It is desirable to use a butadiene-base elastomer obtained by polymerising 98 to 100% by weight of 1,3-butadiene and 0 to 2% by weight of a polyfunctional monomer when it is required to increase greaty the impact resistance of the final resin composition; a butadiene-base elastomer obtained by copolymerizing 80 to 50% by weight of 1,3-butadiene, 20 to 50% by weight of styrene and 0 to 2% by weight of a polyfunctional monomer when a moderately high impact strength is required while the transparency of the PVC resin being substantially retained; and a butadiene-base elastomer obtained by copolymerizing 75 to 30% by weight of 1,3-butadiene, 5 to 30% by weight of n-butyl acrylate, 20 to 50% by weight of styrene, and 0 to 2% by weight of a polyfunctional monomer, when it is intended to increase the impact strength without impairing the transparency of PVC resin.

Prior to the start of graft polymerization, according to this invention, an electrolyte and/or a latex of a polymer containing carboxyl groups is added to the elastomer to enlarge the particle size of the latter. By this addition, immediately after the addition of these substances of during the graft reaction, elastomer particles grow in size. The growth of elastomer particles plays an important role in improving the impact strength of the final resin composition. Since a carboxyl-containing polymer latex promotes the particle growth more effectively than does an electrolyte, if follows that in order to obtain a final composition having a markedly improved impact strength, it is preferable to use as the growth promoter a carboxyl-containing polymer latex either alone or in combination with an electrolyte.

The electrolytes suitable for use are inorganic electrolytes such as sodium chloride, sodium sulfate, potassium chloride, magnesium chloride, magnesium sulfate and calcium chloride and polyelectrolytes such as polyacrylamide, polyacrylic acid, polyvinyl alcohol and polyvinylpyrrolidone. Examples of carboxyl-containing polymer latices suitable for use include those obtained by the emulsion copolymerization of monomer pairs such as n-butyl acrylate-methacrylic acid, ethyl acrylate-methacrylic acid, and n-butyl acrylate-acrylic acid.

The monomer combination to be grafted comprises 12 to 57% by weight of methyl methacrylate, 1 to 24% by weight of $C_{1-8}$-alkyl acrylate or acrylates, 80 to 40% by weight of styrene, and 0 to 3% by weight of at least one of polyfunctional crosslinking agents having one or more alkyl groups in the molecule. If the proportion of methyl methacrylate is either below 12% or above 57%, the impact resistance of the final resin composition will decrease undesirably. The proportion of an alkyl acrylate is 1 to 24% by weight in the monomer combination (B), and 5 to 40% by weight based on total weight of methyl methacrylate and alkyl acrylate. If the proportion is less than 1%, both the melt fluidity and the effectiveness of preventing the formation of fish eyes become insufficient, while if the proportion exceeds 24%, the compatibility with a PVC-base resin decreases and the surface appearance of shaped articles becomes inferior.

The alkyl acrylates suitable for use are those having alkyl groups of 1 to 8 carbon atoms such as, for example, methyl acrylate, ethyl acrylate, propyl acrylate, n-butyl acrylate, isobutyl acrylate, tert-butyl acrylate, 2-ethylhexyl acrylate, and n-octyl acrylate.

Styrene is used in a proportion of 80 to 40% by weight. If the proportion is either below 40% or above 80%, the transparency of the PVC-base resin composition decreases undesirably.

The proportion of polyfunctional crosslinking agent having one or more alkyl groups in the molecule is 3% by weight or less. It is exceeds 3% by weight, the impact resistance of the PVC-base composition decreases undesirably.

The graft polymerization is carried out in three stages. In the first stage, methyl methacrylate together with an alkyl acrylate in an amount corresponding to 50 to 90% of the total weight to be grafted of both monomers and 0 to 3% by weight of a polyfunctional crosslinking agent are charged to undergo graft polymerization, in the second stage styrene is graft-polymerized, and in the third stage the remaining methyl methacrylate or methyl methacrylate and alkyl acrylate in amounts corresponding to 10 to 50% of the total weight of both monomers are graft-polymerized.

When the alkyl acrylate is used with methyl methacrylate, the graft polymer is markedly improved in melt fluidity and the formation of fish eyes is greatly reduced. Such a tendency becomes more marked with the increase in number of carbon atoms of the alkyl group in acrylate esters. The advantage of alkyl acrylate is most effectively exhibited when it is added in the first stage in an amount less than that of methyl methacrylate. If the alkyl acrylate is graft-polymerized together with styrene in the second stage, the transparency of the final resin composition becomes markedly decreased. Although an alkyl acrylate can be used together with methyl methacrylate in the third stage, yet it is preferred not to use it in this stage if a high degree of transparency is required for the final resin composition.

The alkyl acrylate introduced together with methyl methacrylate in the first stage has an important influence on the augmentation of impact strength in addition to the aforesaid improvement of melt fluidity and prevention of the formation of fish eyes. According to this invention, prior to the commencement of graft polymerization, an electrolyte and/or a carboxyl-containing polymer latex is added to the elastomer preferably having a particle size below $0.12\mu$, to agglomerate and enlarge its particles for the purpose of improving the impact strength. The alkyl acrylate added in the first stage of graft polymerization greatly effects the enlargement behavior. This enhancing effect of alkyl acrylates on impact strength becomes larger with the decrease in number of carbon atoms of the alkyl group.

Suitable alkyl acrylates are methyl acrylate, ethyl acrylate, propyl acrylate, n-butyl acrylate, tert-butyl acrylate, and isobutyl acrylate. These acrylates are used each alone or preferably in combinations of two or more.

The polyfunctional crosslinking agent having one or more alkyl groups in the molecule is used in an amount of 3% by weight or less in the first stage of graft polymerization. The addition of such a crosslinking agent is effective for the prevention of stress whitening without deterioration in impact resistance of the PVC-base resin composition. However, if it is added in an amount exceeding 3% by weight, the impact resistance will be declined. Also, if a polyfunctional crosslinking agent having no alkyl group, such as divinylbenzene or ethylene glycol dimethacrylate is used in the first stage graft-polymerization, the impact resistance will be markedly reduced and the improvement in stress whitening will be unsatisfactory. Examples of polyfunctional crosslinking agents having one or more allyl groups in the molecule are trialkyl cyanurate, triallyl isocyanurate, allyl methacrylate, allyl acrylate, diallyl itaconate, and diallyl phthalate. Of these, particularly preferred are allyl methacrylate and triallyl cyanurate.

As described above, in order to solve simultaneously the problems concerning impact resistance, gloss and fish eyes, it is necessary to graft-polymerize in the first stage 50 to 90% of the grand total weight of methyl methacrylate and alkyl acrylate. If the sum of methyl methacrylate and alkyl acrylate graft-polymerized in the first stage is less than 50%, the surface gloss will be unsatisfactory. According to this invention, it is also necessary to graft-polymerize styrene in the second stage and to graft-polymerize 10 to 50% of the grand total weight of methyl methacrylate and alkyl acrylate in the third stage. If the amount of monomers grafted in the third stage is less than 10% of the grand total weight of methyl methacrylate and alkyl acrylate grafted in the first and third stages, the impact resistance will become inferior and, moreover, the amount of residual unreacted styrene will be increased, because of the shortage of methacrylate and acrylate monomers to be copolymerized with the residual styrene which was not reacted in the second stage. The ratio of methyl methacrylate to alkyl acrylate in the third stage can be the same as that in the first stage. However, in view of the compatibility of the graft polymer with PVC, it is desired that methyl methacrylate dominates as far as possible in the third stage.

The elastomer content of the graft copolymer should be 35 to 75% by weight. If it is below 35%, the impact strength of the final composition will be insufficient, while if it exceeds 75%, the surface characteristics will become undesirably inferior.

The polymerization initiators to be used in the manufacture of graft copolymers are potassium persulfate, ammonium persulfate, hydrogen peroxide, cumene hydroperoxide, p-menthane hydroperoxide, and diisopropylbenzene hydroperoxide. A redox-type of initiator system may also be used, the effective reducing component being Rongalite or sodium hydrogensulfite. If necessary, small amounts of a chain transfer and an emulsifier may be added. The emulsifiers suitable for use include anionics such as fatty acid salts, alkyl sulfates, alkyl sulfonates, and alkylarylsulfonates and nonionics such as glyceryl monoalkyl carboxylates and polyethylene glycol alkyl ethers.

The PVC-base resin, which is another component of the present composition, is a homopolymer of vinyl chloride or a copolymer of 70% or more of vinyl chloride and 30% by weight or less of a copolymerizable monomer such as vinyl bromide, vinylidene chloride, vinyl acetate, acrylic acid, methacrylic acid, or ethylene.

The graft copolymer latex is admixed with a suitable antioxidant or other additives, then coagulated by the addition of an inorganic electrolyte, subjected to heat treatment, dehydrated, washed, and dried. The graft copolymer thus obtained is blended in the powder form with a powdered PVC-base resin by means of, for example, a ribbon blender or Henschel mixer and milled and molded by means of a mixing roll, Bambury mixer, or an extruder. If necessary, known stabilizers, plasticizers, processing aids, and colorants may be added. The graft copolymer content of 100 parts by weight of the final composition is 3 to 40 parts by weight. If added in an amount below 3 parts, the graft copolymer exhibits practically no effect, while if the content exceeds 40 parts, other desirable characteristics of PVC will be lost and, in addition, it is uneconomical.

In the following Examples, all parts and percentages are by weight.

EXAMPLE 1

A mixture of 100 parts of 1,3-butadiene, 4 parts of sodium laurate, 0.5 part of n-lauryl mercaptan, 0.4 part of potassium persulfate and 180 parts of deionized water was charged into an autoclave flushed with nitrogen. While stirring, polymerization was allowed to proceed at 60° C. for 50 hours to obtain a rubber latex (E-1) of 0.09µ in average particle size. Into a flask flushed with nitrogen, were charged 50 parts (in terms of solids) of the above rubber latex (E-1), 0.8 part of sodium chloride as electrolyte, and 0.15 part of Rongalite as reducing agent. To the mixture maintained at 70° C., was added dropwise and continuously a mixture of 4 parts of ethyl acrylate and 16 parts of methyl methacrylate containing 0.08 part of cumene hydroperoxide (hereinafter referred to briefly as CHP) over a period of one hour. To the mixture, after having been kept as the same temperature for additional one hour, was added dropwise and continuously a mixture of 25 parts of styrene and 0.1 part of CHP over a period of one hour to allow the second stage graft polymerization to proceed. To the reaction mixture, which had been kept at the same temperature for additional two hours, was added dropwise a mixture of 4 parts of methyl methacrylate, 1 part of ethyl acrylate and 0.02 part of CHP over a period of 15 minutes to allow the third stage graft polymerization to proceed. The mixture was kept at the same temperature for additional one hour to complete the polymerization. The resulting latex was admixed with 0.5 part of butylated hydroxytoluene (BHT) and coagulated by the addition of 0.2% sulfuric acid. The coagulum was washed with warm water and dried to obtain a sample of graft copolymer (G-1). A reference sample was prepared by the same procedure as above, except that methyl methacrylate was used in place of the ethyl acrylate in the first and third stages of graft polymerization.

Each sample (10 parts) was added to each 100 parts of polyvinyl chloride having an average polymerization degree of 730 and mixed with 2.0 parts of dioctyl phthalate, 3.0 parts of dibutyltin maleate and 1.5 parts of a lubricant in a Henschel mixer while elevating the temperature to 120° C. to obtain a uniform mixture. The mixture was extruded from a 40-mm φ extruder provided with a T-die to a flat film of 0.3 mm in thickness. The film was evaluated for the surface appearance and the fish eyes content. The film was compression molded by a hot press for 5 minutes at 180° C. and 50 kg/cm² to prepare test specimens.

TABLE I

| | Rubber content (parts) | Composition of graft monomer (%) | | | Impact strength of sheet* (kg · cm/cm²) | Surface appearance of sheet** | Fish eyes |
|---|---|---|---|---|---|---|---|
| | | 1st stage MMA/EA | 2nd stage St | 3rd stage MMA/EA | | | |
| Example 1 | 50 | 32/8 | 50 | 8/2 | 25.4 | ⊙ | None |
| Comp. Example 1 | 50 | 40/0 | 50 | 10/0 | 13.6 | ⊙ ~ O | Considerable |

Note:
MMA: methyl methacrylate,
EA: ethyl acrylate,
St: styrene

*Impact strength: Charpy impact strength according to ASTM D 256-56 (test specimen, 15 × 90 × 5 mm, V-notched, 2 mm in depth).

**Surface appearance of sheet: (good) ⊚ > ⊙ ~ O > O > Δ > X (poor)

As is apparent from Table 1, the present composition showed very little fish eyes content and excellent impact strength.

EXAMPLE 2

Graft copolymers were prepared as in Example 1 by adding a catalyst, electrolyte, and reducing agent to 60 parts of the elastomer prepared in Example 1 and using 40 parts in total of a monomer combination in a proportion as shown in Table 2 in the 3-stage graft polymerization. In a manner similar to that in Example 1, 10 parts of each graft copolymer was mixed with 100 parts of polyvinyl chloride (polymerization degree 730) to form a composition and tested for impact strenght, surface appearance of sheet and fish eyes content of sheet. The results obtained were as shown in Table 2.

TABLE 2

| | Rubber content (parts) | Graft monomer composition (%) | | | Impact strength of sheet (kg·cm/cm²) | Surface appearance | Fish eyes |
|---|---|---|---|---|---|---|---|
| | | 1st stage MMA/BA/MA | 2nd stage St | 3rd stage MMA | | | |
| Comp. Example 2 | 60 | 40/0/0 | 50 | 10 | 15.6 | ◉ | Considerable |
| Example 2-1 | 60 | 38/2/0 | 50 | 10 | 23.8 | ◉ | A little |
| Example 2-2 | " | 36/4/0 | " | " | 28.0 | ◉ | None |
| Example 2-3 | " | 32/8/0 | " | " | 26.4 | ◉~O | " |
| Example 2-4 | " | 34/4/2 | " | " | 31.4 | ◉ | " |
| Example 2-5 | " | 35/4/1 | " | " | 29.7 | ◉ | " |
| Comp. Example 3 | 60 | 20/20/0 | 50 | 10 | 8.7 | Δ | " |

Note:
BA: n-butyl acrylate,
MA: methyl acrylate

As is apparent from Table 2, by introducing an alkyl acrylate, the sheet is improved in fish eyes content and impact strength. However, unless the amount of an alkyl acrylate used in the first stage is less than that of methyl methacrylate, the surface appearance and impact strength of the sheet becomes inferior.

EXAMPLE 3

(1) Preparation of rubber latex (E-2).

| | Parts |
|---|---|
| 1,3-Butadiene | 75 |
| Styrene | 25 |
| Divinylbenzene | 1 |
| Diisopropylbenzene hydroperoxide | 0.2 |
| Sodium pyrophosphate | 0.5 |
| Ferrous sulfate | 0.01 |
| Dextrose | 1.0 |
| Potassium oleate | 2.0 |
| Water | 200 |

Using the above recipe, polymerization was carried out in an autoclave at 50° C. The polymerization was completed in 8 hours. The average particle size of the resulting rubber latex was 0.08μ.

(2) Preparation of polymer latex (B-1) for rubber particle enlargement:

| | Parts |
|---|---|
| Ethyl acrylate | 90 |
| Methacrylic acid | 10 |
| Potassium persulfate | 0.5 |
| Nonsoul TK-1 (a potassium soap of semihardened beef tallow, a product of Nippon Oils and Fats Co.) | 2.0 |
| Rapisol 80 (sodium octyl sulfosuccinate, a product of Nippon Oils and Fats Co.) | 1.0 |
| Water | 200 |

Using the above recipe, polymerization was carried out at 70° C. for 4 hours to obtain an emulsion latex having a pH of 6.2.

(3) Preparation of latex with enlarged particles.

Into a reactor provided with a stirrer, was charged 100 parts (as solids) of the latex (E-2). To the latex in the reactor, was added dropwise with stirring 0.3 part (as solids) of the latex (B-1) over a period of 10 seconds to obtain a latex with enlarged particles.

(4) Preparation of graft copolymer.

Graft polymerization was carried out as in Example 1 using the latex (60% solids content) with enlarged particles and the effect of monomer ratios in the first and third stages was examined. The total of the monomers grafted was 40 parts. The styrene grafted in the second stage was 50% of the total monomer. The remaining 50% was methyl methacrylate and ethyl acrylate grafted in the first and third stages.

In Comparative Example 4, a graft copolymer was prepared by the two-stage polymerization using styrene in the first stage and methyl methacrylante plus ethyl acrylate in the second stage. In Comparative Example 5, a graft copolymer was obtained by using in the first stage methyl methacrylate and ethyl acrylate smaller in total weight than that in the third stage. In Comparative Example 6, a graft copolymer was prepared in two-stage polymerization using methyl methacrylate and ethyl acrylate in the first stage and styrene in the second stage.

In Table 3 are shown the results of evaluation of physical properties of the composition comprising 10 parts of each graft copolymer and 100 parts of polyvinyl chloride having a polymerization degree of 730.

TABLE 3

| | Rubber content (parts) | Graft monomer composition (%) | | | Impact strength of sheet (kg·cm/cm²) | Surface appearance | Residual styrene in graft latex (%) |
|---|---|---|---|---|---|---|---|
| | | 1st stage MMA/EA | 2nd stage St | 3rd stage MMA/EA | | | |
| Comp. Example 4 | 60 | 0 | 50 | 45/5 | 30.2 | X | <0.03 |
| Comp. Example 5 | " | 18/2 | " | 27/3 | 32.4 | Δ | <0.03 |
| Example 3-1 | 60 | 22.5/2.5 | 50 | 22.5/2.5 | 34.8 | ◉~O | <0.03 |
| Example 3-2 | " | 36/4 | " | 9/1 | 33.3 | ◉ | 0.04 |
| Example 3-3 | " | 40.5/4.5 | " | 4.5/0.5 | 31.8 | ◉ | 0.06 |

TABLE 3-continued

| | Rubber content (parts) | Graft monomer composition (%) | | | Impact strength of sheet (kg · cm/cm$^2$) | Surface appearance | Residual styrene in graft latex (%) |
|---|---|---|---|---|---|---|---|
| | | 1st stage MMA/EA | 2nd stage St | 3rd stage MMA/EA | | | |
| Comp. Example 6 | 60 | 45/5 | 50 | 0 | 26.4 | ⊚ | 0.94 |

From Table 3, it is seen that by graft-polymerizing methyl methacrylate and an alkyl acrylate in the third stage, the residual styrene is so much decreased that the styrene content of the dried polymer becomes nil irrespectively of the drying conditions, whereas if the amount of methyl methacrylate plus alkyl acrylate grafted in the third stage is increased, the surface condition becomes inferior.

EXAMPLE 4

Graft polymerization was carried out as in Example 1 using the same enlarged latex as used in Example 3. The amounts of monomers (based on grand total of grafted monomers) grafted in each stage were as follows: in the first stage 34% of methyl methacrylate and 6% of n-butyl acrylate, in the second stage 50% of styrene, and in the third stage 10% of methyl methacrylate (100% in grand total).

To 10 parts of the graft copolymer, was added 100 parts of polyvinyl chloride (polymerization degree 700) followed by each 1 part of a sulfur-containing octyltin compound and powdered octyltin maleate as stabilizers, 0.5 part of an external lubricant, and 1.5 parts of an internal lubricant. The mixture was mixed for 10 minutes in a Henschel mixer at 110° C. The resulting compound was fed to a 50-mmφ blow molding machine and a bottle having a volume of 300 cc was molded. The bottle was filled with cold water at 3° C. and tested for drop impact strength. The results obtained were as shown in Table 4.

TABLE 4

| | Rubber content (%) | Drop strength of bottle, height of 50% rupture (cm) | Surface gloss of blow-molded article |
|---|---|---|---|
| Comparative Example 7 | 30 | 90 | ⊚ |
| Example 4-1 | 35 | 170 | ⊚ |
| Example 4-2 | 50 | 300 | ⊚ |
| Example 4-3 | 75 | >300 | ⊚~○ |
| Comparative Example 8 | 80 | >300 | △ |

When the rubber content was decreased below 35%, the impact strength declined, while if it is increased beyond 75%, the surface gloss of the molded article became markedly inferior.

EXAMPLE 5

| | parts |
|---|---|
| 1,3-Butadiene | 57 |
| n-Butyl acrylate | 10 |

-continued

| | parts |
|---|---|
| Styrene | 33 |
| Potassium oleate | 3.0 |
| Potassium persulfate | 0.4 |
| Deionized water | 180 |

A mixture of the above composition was charged into an autoclave flushed with nitrogen and allowed to react with stirring at 60° C. for 20 hours to obtain an elastomer (E-3) (97% conversion; 0.10μ in average particle size). A graft copolymer was obtained by using the same electrolyte, reducing agent and catalyst as used in Example 1 and graft polymerizing in three stages a total of 40 parts of methyl methacrylate, ethyl acrylate and styrene onto 60 parts of the above elastomer (E-3), the monomer combination being as shown in Table 5. A composition comprising 10 parts of the graft copolymer and 100 parts of polyvinyl chloride was processed and tested for drop impact strength of bottol as in Example 4.

As is apparent from Table 5, the amount of styrene to be grafted in the second stage is preferably 80 to 40%.

TABLE 5

| | Graft monomer composition (%) | | | Drop strength of bottle, height of 50% rupture (cm) |
|---|---|---|---|---|
| | 1st stage MMA/EA | 2nd stage St | 3rd stage MMA/EA | |
| Comp. Example 9 | 4/1 | 90 | 4/1 | 90 |
| Example 5-1 | 9/6 | 80 | 3/2 | 230 |
| Example 5-2 | 27/3 | 60 | 9/1 | 280 |
| Example 5-3 | 38/2 | 40 | 19/1 | 140 |
| Example 5-4 | 30/20 | 40 | 6/4 | 170 |
| Comp. Example 10 | 63/7 | 20 | 9/1 | 40 |

EXAMPLE 6

Graft copolymerization was carried out in the same manner as in Example 1, except that 60 parts of the same elastomer (E-3) as used in Example 5 was used and 1.2 parts of sodium chloride was added as an electrolyte. The grand total of the methyl methacrylate, alkyl acrylate and styrene used in the first, second and third stages was 40 parts. The monomer compositions were as shown in Table 6. The average particle size before and after the graft copolymerization was determined. Similarly to Example 1, 10 parts of the graft copolymer was mixed with 100 parts of PVC (average polymerization degree 730) and processed into a sheet of evaluate the fish eyes content.

TABLE 6

| | Graft monomer composition (%) | | | Average particle size μ | | |
|---|---|---|---|---|---|---|
| | 1st stage MMA/MA/EA/BA | 2nd stage St | 3rd stage MMA | Before grafting | After grafting | Fish eyes content |
| Comp. Example 11 | 39.5/0.5/0/0 | 50 | 10 | 0.100 | 0.252 | Considerable |
| Example 6-1 | 38/0/2/0 | 50 | 10 | 0.100 | 0.232 | A little |
| Example 6-2 | 36/0/4/0 | " | " | " | 0.247 | Very little |
| Example 6-3 | 36/0/0/4 | " | " | " | 0.174 | None |

From Table 6, it is seen that the particle growth takes place more easily with the decrease in number of carbon atoms of the alkyl group in the alkyl acrylate used in the first stage graft polymerization and that the formation of fish eyes is prevented more effectively with the increase in number of carbon atoms of the alkyl group in the alkyl acrylate.

EXAMPLE 7

The same graft copolymer (G-2) as used in Example 6-3 was mixed with PVC in varied ratios and tested, as in Example 1, for impact strength, surface appearance and fish eyes content.

TABLE 7

| | PVC/G-2 | Impact strength of sheet (kg · cm/cm²) | Surface appearance of sheet | Fish eyes content |
|---|---|---|---|---|
| Comp. Example 12 | 100/0 | 3.5 | ◉ | A little |
| Example 7-1 | 95/5 | 15.6 | ◉ | None |
| Example 7-2 | 90/10 | 59.3 | ◉ | None |
| Example 7-3 | 80/20 | not broken | ◉ | None |
| Example 7-4 | 70/30 | not broken | ◉~○ | Very little |
| Comp. Example 13 | 50/50 | 32.9 | △ | considerable |

EXAMPLE 8

Graft copolymerization was carried out in the same manner as in Example 6, except that in preparing the same graft copolymer (G-2) as used in Example 6-3, the type and amount of the crosslinking agent to be added in the first stage graft copolymerization were varied as shown in Table 8. A mixture of 10 parts of the graft copolymer and 100 parts of PVC (polymerization degree 730) was evaluated as in Example 1. The results obtained were as shown in Table 8.

As is apparent from Table 8, the resistance of the sheet against whitening in flexure was improved by the addition of a polyfunctional crosslinking agent having one or more allyl groups in the molecule. The preferable amount of crosslinking agent to be added is 3% or less. If it is added in excess of 3%, the impact resistance will be decreased. When a crosslinking agent having no allyl groups is used, the sheet is much inferior in impact resistance and little improved in the resistance of the sheet against whitening in flexure.

TABLE 8

| | Crosslinking agent* Type | % | Impact resistance of sheet (kg · cm/cm²) | Resistance of sheet against whitening in flexure** | Surface characteristics of sheet |
|---|---|---|---|---|---|
| Example 8-1 | AMA | 0 | 27.6 | ○ | ◉ |
| Example 8-2 | " | 0.1 | 27.9 | ○–◉ | ◉ |
| Example 8-3 | " | 0.5 | 27.4 | " | ◉ |
| Example 8-4 | " | 1.0 | 26.9 | ◉ | ◉ |
| Example 8-5 | " | 3.0 | 25.4 | ◉ | ◉ |
| Example 8-6 | TAIC | 0.5 | 27.3 | ○–◉ | ◉ |
| Example 8-7 | AA | 0.5 | 27.0 | " | ◉ |
| Comparative Example 14 | AMA | 5.0 | 19.8 | ◉ | ◉ |
| Comparative Example 15 | DVB | 1.0 | 22.8 | ○ | ◉ |
| Comparative Example 16 | DEGDM | 1.0 | 23.2 | ○ | ◉ |

Note:
*AMA: Allyl methacrylate
AA: Allyl acrylate
TAIC: Triallyl isocyanurate
DVB: Divinylbenzene
DEGDM: Diethylene glycol dimethacrylate
**Resistance of sheet against whitening in flexure (visually evaluated) (good) ◉> ○ – ◉> ○ > △ > X (poor)

What is claimed is:

1. A composition with high impact resistance and little fish eyes content, comprising 97 to 60 parts by weight of a polyvinyl chloride-base resin and 3 to 40 parts by weight of a graft copolymer obtained by the 3-stage graft-polymerization of 65 to 25 parts by weight of a monomer combination (B) comprising 12 to 57% by weight of methyl methacrylate, 1 to 24% by weight of at least one of alkyl acrylates having a $C_{1-8}$-alkyl group, 80 to 40% by weight of styrene and 0 to 3% by weight of at least one of polyfunctional crosslinking agents having one or more allyl groups in the molecule onto 35 to 75 parts by weight of a butadiene-base elastomer (A) containing 30% by weight or more of 1,3-butadiene units, said 3-stage graft polymerization being carried out in the following way: at first at least one member selected from the group consisting of electrolytes and carboxyl-containing polymer latices is added to the butadiene-base elastomer (A), then, in the first stage monomer mixture consisting of major amount of methyl methacrylate and minor amount of an alkyl acrylate or acrylates, which has a proportion of 50 to 90% by weight based on total weight of methyl methacrylate and alkyl acrylate or acrylates, and, if included in said monomer combination, a polyfunctional crosslinking agent are graft-polymerized; in the second stage, styrene is graft-polymerized; and in the third stage, the remaining 10 to 50% by weight of methyl methacrylate or methyl methacrylate and an alkyl acrylate or acrylates are graft-polymerized.

2. A composition according to claim 1, wherein the butadiene-base elastomer is an elastomer obtained by the polymerization of 98 to 100% by weight of 1,3-butadiene and 0 to 2% by weight of a polyfunctional monomer.

3. A composition according to claim 1, wherein the butadiene-base elastomer is an elastomer obtained by the copolymerization of a mixture comprising 80 to 50% by weight of 1,3-butadiene, 20 to 50% by weight of styrene and 0 to 2% by weight of a polyfunctional monomer.

4. A composition according to claim 1, wherein the butadiene-base elastomer is an elastomer obtained by the copolymerization of a mixture comprising 75 to 30% by weight of 1,3-butadiene, 5 to 30% by weight of n-butyl acrylate, 20 to 50% by weight of styrene and 0 to 2% by weight of a polyfunctional monomer.

5. A composition according to claim 1, wherein the alkyl acrylate used in the graft polymerization is at least one member selected from the group consisting of methyl acrylate, ethyl acrylate, propyl acrylate, n-butyl acrylate, tert-butyl acrylate and isobutyl acrylate.

6. A composition according to claim 1, wherein in the graft-polymerization, a carboxyl-containing polymer latex and, if necessary, an electrolyte are added to the butadiene-base elastomer (A).

7. A composition according to claim 1, wherein in the third stage graft-polymerization, the combination of remaining monomers comprises a major amount of methyl methacrylate and a minor amount of an acrylate ester.

8. A composition according to claim 1, wherein the remaining monomer graft-polymerized in the third stage is methyl methacrylate alone.

* * * * *